United States Patent [19]

Villata

[11] Patent Number: 5,794,754

[45] Date of Patent: Aug. 18, 1998

[54] LINER SUPPORT DISC FOR A CLUTCH FRICTION WHEEL, ESPECIALLY FOR A MOTOR VEHICLE

[75] Inventor: Gino Villata, Buttigliera D'Asti, Italy

[73] Assignee: Valeo, Paris, France

[21] Appl. No.: 481,469

[22] PCT Filed: Nov. 8, 1994

[86] PCT No.: PCT/FR94/01298

§ 371 Date: Jul. 10, 1995

§ 102(e) Date: Jul. 10, 1995

[87] PCT Pub. No.: WO95/13483

PCT Pub. Date: May 18, 1995

[30] Foreign Application Priority Data

Nov. 9, 1993 [FR] France ................... 93/13341
Mar. 18, 1994 [FR] France ................... PCT/FR94/00297
Jun. 21, 1994 [FR] France ................... PCT/FR9400752

[51] Int. Cl.[6] ................................ F16D 13/64
[52] U.S. Cl. ............................... 192/107; 192/52.6
[58] Field of Search ..................... 192/107 C, 52, 192/52.6, 107 R

[56] References Cited

U.S. PATENT DOCUMENTS

| 2,566,394 | 9/1951 | Zeidler | 192/107 C |
| 4,108,699 | 8/1978 | de Gennes | |
| 5,076,409 | 12/1991 | Graton et al. | |
| 5,452,783 | 9/1995 | Thirion de Briel et al. | 192/107 C |
| 5,522,490 | 6/1996 | Thirion de Briel et al. | 192/107 C |

FOREIGN PATENT DOCUMENTS

| 579554 | 1/1994 | European Pat. Off. |
| 786598 | 9/1935 | France |
| 794147 | 2/1936 | France |
| 2094693 | 2/1972 | France |
| 2168833 | 8/1973 | France |
| 2424446 | 11/1979 | France |
| 2600732 | 12/1987 | France |
| 8521344 | 10/1985 | Germany |
| 1465913 | 3/1977 | United Kingdom |
| 2191831 | 12/1987 | United Kingdom |
| 2225818 | 6/1990 | United Kingdom |

*Primary Examiner*—Charles A. Marmor
*Assistant Examiner*—Saul Rodriguez
*Attorney, Agent, or Firm*—Longacre & White

[57] ABSTRACT

A liner support disc having tripod like blades (572), each with a central support zone (221A) and two peripheral support zones (522B). A tangential bent portion (380) joins the central zone (221A) to the central zone (161, 162) of the disc, while oblique bent portions join the central zone (221A) to the peripheral zones (522B). A friction liner is bonded to the central zone (221A).

10 Claims, 2 Drawing Sheets

5,794,754

1

LINER SUPPORT DISC FOR A CLUTCH FRICTION WHEEL, ESPECIALLY FOR A MOTOR VEHICLE

BACKGROUND OF THE INVENTION

1. Field of the Invention

The present invention relates to a liner support disc for inclusion in a clutch friction wheel, especially for a motor vehicle, of the kind comprising a central portion and a peripheral portion divided into radial blades which are adapted to receive two friction liners, which may be of a divided type and which extend on either side of the said peripheral portion, with each of the said blades being joined to the said central portion through a foot portion comprising at least one support zone generally parallel to the plane of the said central portion, for contact with at least one of the said friction liners and for the fastening of the latter.

2. Description of the Prior Art

In order to create a new standard liner support disc which is able to rotate at increased speeds, while giving a reduction in embedding and juddering effects, and enabling the adoption of a conical shape to take place, it has been proposed in U.S. Pat. No. 5,452,783 corresponding to the European Application 0 579 554 filed on 15 Jul. 1993 to provide a liner support disc which includes tripod blades.

More precisely, in that document, in order to define blades of the tripod type, at least some of the said blades, referred to as tripod blades, have a central support zone for contact with one of the friction liners and for the fastening of the latter, and two peripheral support zones on either side of the said central zone, for contact with the other one of the said friction liners.

The central support zone decreases in width going towards the outer periphery of the liner support disc, and is offset axially with respect to the central portion and to both of the said peripheral support zones.

The central support zone is joined, firstly to the central portion of the liner support disc through a tangential bent portion at right angles to the radial axis of symmetry of the said tripod blades, and secondly to the said peripheral zones through peripheral bent portions which are oblique with respect to the radial axis of symmetry of the said tripod blades.

Thanks to this arrangement, it is possible to increase the support surfaces and also the number of blades, and to enlarge the central support zone to a very large circumferential width, so that the foot portions of the blades have a very great width and are robust.

In this way, it is possible to have contact surfaces greater than 25% of the total surface area of the back of the liner when the latter is continuous, and the distance between two central support zones is reduced.

As a result, embedding effects, due to embedding of the friction liner within pits existing between two engagement surfaces, are reduced, especially when friction liners of the organic type are employed.

The liner support disc is able to turn at increased speeds of rotation, by being more resistant to the effects of centrifugal force.

Judder effects (brought about by vibrations that occur within the propulsion train going from the engine to the road wheels), which occur just as much at low torques, during a parking manoeuvre or in the garage, as at high torques during gear changes while travelling or during a hill start, are reduced.

2

This liner support disc enables wear in the friction liners to be reduced, and due to the configuration of the blade it is able to follow the tendency of the pressure plate of the clutch to adopt a conical shape.

An object of the present invention is to make further use of these blades of the tripod type.

SUMMARY OF THE INVENTION

In accordance with the invention, the friction liner is attached directly by adhesion on the central support zones associated with it.

Because of this arrangement, it is possible to reduce even further the inertia of the liner support disc, and the latter is able to turn at even higher speeds of rotation.

In this connection, the friction liners now have only the useful thickness, and no excess thickness need be provided as in the case of riveted fastening.

This is made possible due to the central support zones, which offer a high engagement surface area to the friction liners, and which enable tangential bent portions of substantial length to be provided.

In this way, sound fastening of the friction liners on the said central support zones is obtained. This fastening is very robust.

It also becomes possible to take further advantage of the adhesive bonding.

In this connection, with discs having tripod blades, good axial progressive action (progressive gripping of the friction liners between the pressure and reaction plates of the clutch) is obtained during the engagement of the clutch.

Because of the bent portions which give axial offsets, good stability of the blades and good parallelism of the friction liners is obtained. In addition, the foot portions of the blades are very robust, especially because of the substantial length of the tangential bent portions.

Conventionally, this progressive action is obtained in another way. In this connection, as is described for example in the document U.S. PAT. No. 5,076,409, the friction liners are adhesively secured on two flat discs, and the progressive action is obtained by means of projections of elastic material which are interposed between the two discs.

More precisely, at least some of the said projections join the two discs together.

In the document GB-A-2 191 831, this progressive action is obtained by means of a single metallic disc, which is provided at its periphery with two sets of radial lugs offset axially from each other.

The friction liners are attached on the radial lugs, having a small engagement surface, by means of a material made of an elastic substance.

In both of the above mentioned solutions, the liner support disc has a minimal thickness and reduced inertia.

Nevertheless, that makes it necessary to employ projections of elastic material. In order to avoid this, in accordance with one feature of the invention, an arrangement is proposed in which the liner support disc comprises two support discs mounted back to back, at least one of which has blades of the tripod type, on the central support zones of which one of the friction liners is secured adhesively, with the other friction liner being secured adhesively on the other disc.

This arrangement enables a liner support disc of reduced inertia and of minimal thickness to be obtained. This disc is then able to turn at very high rotational speeds, and also gives good support to the friction liners and stable axial progressive action.

In addition, for the transmission of a given torque, these discs have a thickness which is less than that of the disc in the document GB-A-2 191 831, and this favours the progressive action.

It will be appreciated that, by contrast with the arrangements in the document U.S. Pat. No. 5,076,409, the discs do not have to be provided with bent portions at the level of their mutual fastening zone.

Preferably the two liner support discs mentioned above are provided with tripod blades which are mounted back to back and with coupling means, giving uni-directional axial action, interposed between the two support discs in order to limit the spacing between these latter.

The said coupling means comprise, for example, hooks which limit the spacing between the two support discs.

These hooks may be located either in the central support zones, or in the peripheral support zones, or in the support discs, for example at the level of the tangential bent portions, radially inwardly of the latter.

By virtue of this arrangement, it is possible to form a sub-assembly which consists of the two support discs with their friction liners.

Eventually, these two discs are fitted for example on the guide rings of the clutch friction wheel.

Because of the hooks it is possible to provide a bayonet type fitting.

In addition, the coupling means also limit the separation between the two discs which is due to the effect of heat prevailing within the clutch.

As is known, in a clutch the pressure and reaction plates, as well as the friction liners, may reach significantly high temperatures, especially during mountain travel. This results in thermal deformation in the liner support disc.

These thermal deformations will be limited by the coupling means, in such a way that wear in the friction liners is also reduced.

The invention will be more clearly understood on a reading of the detailed description of the preferred embodiment of the invention which follows, and which is given by way of example only and with reference to the accompanying drawings.

DETAILED DESCRIPTION OF THE PREFERRED EMBODIMENT

Figure 1:
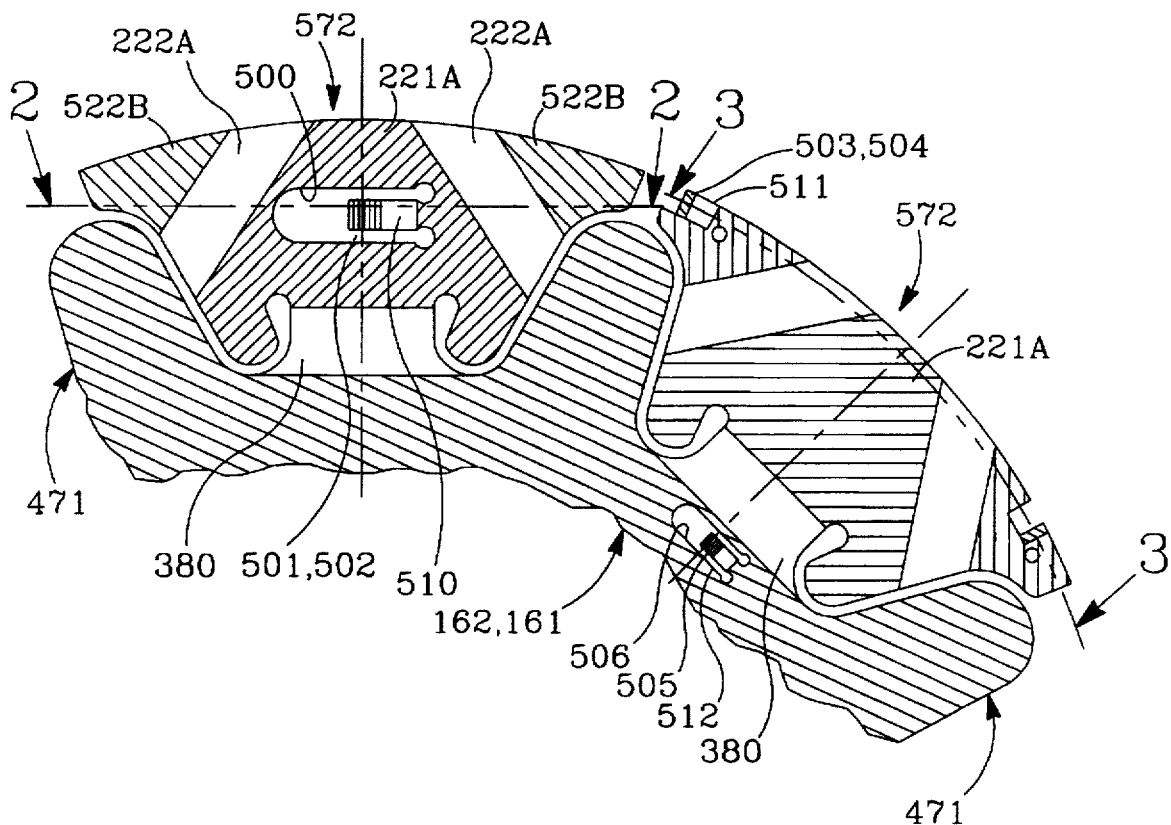
FIG. 1 is a view in axial cross section of a liner support disc in accordance with the invention.
Figure 4:
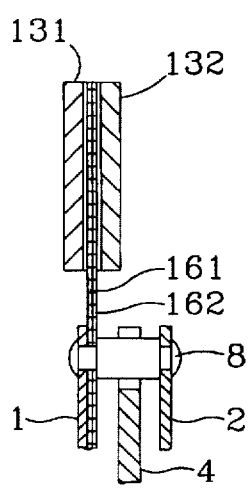
FIG. 4 is a view in cross section taken on the line 4—4 in FIG. 2.

FIG. 1 shows a liner support disc having tripod blades of the same type as in FIG. 20 as the document EP 0 579 554, and for simplicity, the same references will be used for those elements which are common to the invention and to those in the said document.

The said liner support disc is constructed as a clutch friction disc for a motor vehicle.

It comprises a central portion 161, 162 and a peripheral portion which is divided into radial blades 572, for receiving friction liners 131, 132, each of the said blades being joined to the said central portion through a foot portion 380, and comprising at least one support zone 221A which is generally parallel to the mean plane of the said central portion, for contact with at least one of the said friction liners and for the fastening of the latter.

In order to define blades of the tripod type, the blades 572 have a central support zone 221A for contact with at least one of the said friction liners 131, 132 and for the fastening of the latter, together with two peripheral support zones 522B on either side of the said central zone 221A, for contact with the other one of the said friction liners.

The central support zone 221A reduces in width going towards the outer periphery of the said liner support disc, and is offset axially with respect to the central portion 161, 162 and with respect to the two said peripheral support zones 522B.

The central support zone 221A is joined, firstly to the central portion 161, 162 of the liner support disc, through a tangential bent portion 380 at right angles to the radial axis of symmetry of the said tripod blades, and secondly to the said peripheral zones, through peripheral bent portions 222A which are oblique with respect to the radial axis of symmetry of the said tripod blades.

The bent portions 221A are convergent towards the outer periphery of the blades. As a result, the peripheral support zones 522B extend radially beyond the tangential bent portion 380.

Thus, the central support zones 221A are very wide in the circumferential direction, and the same is true for the tangential bent portions 380, so that the foot portions of the blades 572 are very robust.

In this example, the tripod blades 572 are integral with the disc-shaped central portion 161, 162. The blades 572 are arranged in circumferential alternation with a series of radial tongues 471 in the plane of the central portion 161, 162 of the liner support disc. These tongues 471 are integral with the disc-shaped central portion 161, 162.

Part of the peripheral support zones 522B extends radially outwardly of the tongues 471, which have a rounded end partly enveloped by the zones 522B, which are in the form of a bird's wing. The central zone 221A has at its inner periphery two lugs which flank the tangential bent portion 380. The engagement surface of the central zone 221A is thus increased, while it has a very long tangential bent portion 380, which favours the adhesive bonding of the friction liner concerned and the robustness of the blades 572.

Advantage can be taken of this arrangement in order to form apertures 500 in the central zone 221A, in a manner to be described below.

Because of these arrangements, the peripheral zones 522B have a not insubstantial engagement surface, and the central support zone 221A is enlarged by comparison with that in FIGS. 6, 14, 15, 16 of the above mentioned document EP 0 579 554.

The liner support disc may of course have a configuration similar to that in the said FIGS. 6, 14, 15, 16 of the above mentioned document.

Be that as it may, in accordance with the invention the friction liner is adhesively secured directly on its associated central support zone 221A.

In this way, a liner support disc is obtained that has a reduced inertia and good progressive action.

In this example, the liner support disc comprises two supports 161, 162 in back-to-back relationship. A friction liner 131, 132 is secured adhesively on each central support zone of a support, in a manner described below. These supports are arranged to be fixed to a guide ring 1 of a torsion damper, by means of spacer bars 8 which join together the two guide rings 1, 2 which are part of the torsion damper.

To this end, the spacer bars extend through apertures in a damper plate 4 of the damper.

In this example, the support discs 161, 162 are coupled elastically to a hub, not shown, which is splined internally for mounting it on the input shaft of the gearbox, for rotation with the latter.

The friction liners 131, 132 are in this example in the form of a continuous circle, being of the organic type, as for example in the document FR-A-2 094 693, and being for example reinforced by "KEVELAR" glass fibres.

The said liners 131, 132 are arranged to be gripped between the pressure plate and the reaction plate (not shown) of the clutch, the said reaction plate being mounted on the crankshaft of the internal combustion engine, for rotation with it in a manner known per se.

Conventionally, circumferentially acting resilient means (not shown) are mounted in windows formed in facing relationship with each other in the guide rings 1, 2 and in the damper plate 4 which is flanked by the rings 1, 2.

In a modification, the supports 161, 162 may be fixed to a damper plate secured to the hub.

For further detail, reference is made for example to FIGS. 2 to 4, 22 and 28 of the above mentioned document EP 0 579 554.

In this example, the discs 161, 162 are identical, and are mounted back to back, with their tongues 471 being in contact with each other, while the peripheral zones 522B of the tripod blades 572 of one blade are in contact with those of the other.

The central support zones 221A are in facing relationship to each other.

The peripheral zones 522B in this example are in the plane of the discs 161, 162 which enables good stability to be obtained for the friction liners 131, 132.

In order to form a sub-assembly consisting of the discs 161, 162 and liners 131, 132, uni-directionally axially acting coupling means, for limiting the spacing between the two discs 161, 162, are provided.

Figure 2:
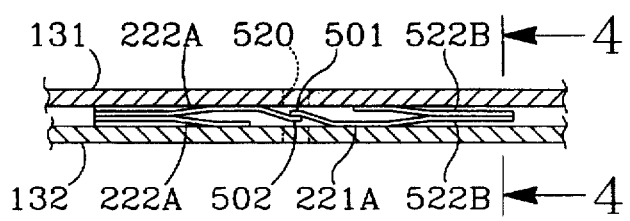
FIG. 2 is a view in cross section taken on the line 2—2 in FIG. 1.
Figure 3:
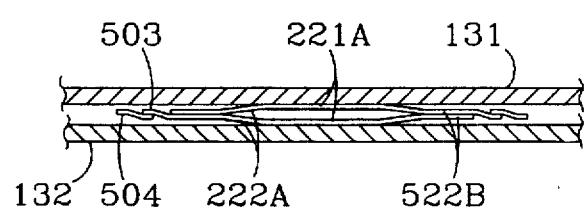
FIG. 3 is a view in cross section taken on the line 3—3 in FIG. 1.

These coupling means comprise, in FIGS. 1 to 3, at least one hook which is carried by one of the discs 161, 162, and which is arranged to come into abutment with an associated abutment surface carried by the other disc.

The hook is either carried by the central zone 221A, or by the peripheral zones 522B, or by the central portion of the disc 161, 162, preferably in the vicinity of the tangential bent portions 380 and radially inwards of the latter.

In one embodiment, these coupling means comprise, for each of the discs 161, 162, lugs which are adapted to make contact with each other. These lugs are part of the hooks.

More precisely, in one embodiment (FIGS. 1 and 2), the coupling means 501, 502 comprise, for each disc 161, 162, a lug 501, 502 respectively, which is formed by a pressing operation in the central support zone 221A on which the friction liner 131, 132 concerned is secured adhesively.

These lugs 501, 502 are formed in an aperture 500 in the form of an oblong hole which is formed in the central zone 221A. The lugs 501, 502 are joined to the central zone 221A through an inclined zone 501 that defines a bent portion which stems from the central zone 221A, with holes (FIG. 1) being formed in order to limit stress raisers.

In this way, a hook 501, 502-510 is created, which extends mostly on one side of a radial axis of symmetry of the tripod blade 572, with only the lug 501, 502 extending on either side of the said axis for cooperation with the associated lug of the other disc.

Thus the lug 501, 502 extends parallel to the central support zone 221A, being offset axially towards the friction liner opposite to the one that is fixed on the central zone 221A.

This axial offset is obtained by virtue of the inclined zone 501 that constitutes a bent portion. Thus, the lug 501 is cantilevered, while the oblong hole 500 is generally parallel to the tangential bent portions 380.

For reasons of robustness, the said hole 500 extends radially and centrally between the outer periphery of the central zone 221A and the tangential bent portion 380, which in this example constitutes by itself the foot portion of the tripod blade 572.

The hole 500 is elongated at right angles to the radial axis of symmetry of the blade 572, symmetrically between two of the bent portions 222A of the blade 572.

As will have been understood, one of the discs 161, 162 includes a lug 501, 502 which extends from one edge of the support zone 221A towards the other edge of the said zone 221A, and vice versa for the other disc.

It is possible in this way to provide a fitting of the bayonet type. For example, the lug 501 of one of the discs 161, 162 is introduced into the aperture 500 of the other disc 162, 161, and is then rotated circumferentially in order to come into engagement with the associated lug 502 of the other disc.

The aperture 500 is of course dimensioned accordingly. In this way a sub-assembly is readily formed, which comprises the two discs 161, 162 and the two liners 131, 132, with the axial spacing being limited by cooperation of the lugs 501, 502.

When the sub-assembly 161, 162, 131, 132 is fitted on the guide rings 1, 2, the lugs 501, 502 are in engagement with each other when the clutch is disengaged, as can be seen in FIG. 2.

The axial spacing between the tripod blades 572 is thus limited.

It will be noted that in these Figures, the lugs 501, 502 are generally in the same plane as the peripheral support zones 522B, which are themselves in the same plane as the discs 161, 162.

This is made possible due to the fact that the central support zones 221A have a large surface area.

The lugs of the coupling means can of course be located at the level of the peripheral support surfaces 522B as can be seen in FIGS. 1 and 3.

Thus, the lugs 503, 504 are joined to the peripheral support zone 522B through a bent portion 511, being offset axially with respect to the peripheral zone 522B, but parallel to this latter.

A bayonet type fitting can also be provided. In this version, the lugs 503, 504 are located at the outer periphery of the zones 522B, with one lug for each peripheral zone. Two hooks 503, 504-511 are thus formed for each blade 572.

It will be appreciated that the central support zone 221A is intact, since it does not have any apertures. Thus the liners 131, 132 are adhesively attached on a support zone of increased size.

As will have been understood, because of the bent portions 380, the discs 161, 162 are divergent with respect to each other, and in a clutch, during operation of the latter, the liners 131, 132 are arranged to be moved towards each other, while the same is true of the blades 572. Because of the bent portions 222A, the discs 161, 162 deflect towards each other, and, during this operation of the clutch, the blades 572 are squeezed elastically, which enables the desired progressive action to be obtained.

The position of the lugs 503, 504, and therefore their axial offset with respect to the central support zones 221A and the peripheral support zones 522B, is of course such that the said lugs enable the liners 131, 132 to be squeezed in this way. The same is true as regards the lugs 501, 502.

The lugs 501, 502 can of course perfectly well not lie in the plane of the support zones 522B.

In that case, and as can be seen in broken lines in FIG. 2, it is sufficient to provide relief holes 520 in the friction liners 131, 132, in order to avoid any interference of the lugs 501, 502 with the friction liners 131, 132.

All of this does depend on the applications.

As will have been understood, good progressive action is obtained.

It will also be appreciated that the blades 572 may follow the tendency of the pressure plate to assume a conical shape under the effect of heat, due in particular to their bent portion 380, which enables wear to be reduced.

It will be appreciated that the coupling means then enable the spacing between the liners 131, 132, due to the effects of thermal deformation, to be again limited. These coupling means then limit the opening between the two discs 161, 162.

The present invention is of course not limited to the embodiment described.

Thus, the liner support disc may have only a single support disc, with tripod blades being arranged alternately with radial tongues, as for example in FIG. 25 of the above mentioned document EP 0 579 554, the tripod blades carrying, on their central support zone, the friction liner for cooperation with the pressure plate of the clutch, the said liner being fixed adhesively on to the said central zones, and the latter not having any aperture.

The other friction liner is then fixed on to the tongues, preferably adhesively.

By bonding the tongues adhesively to each other, for example the tongues 471, a sub-assembly can be formed.

The said single support disc may have two sets of tripod blades alternating with each other, as in FIG. 14 of the above mentioned document.

One of the sets is stiffer than the other, namely the set of blades on the central zone, on which the friction liner which is arranged for cooperation with the reaction plate of the clutch is adhesively attached.

Figure 5:
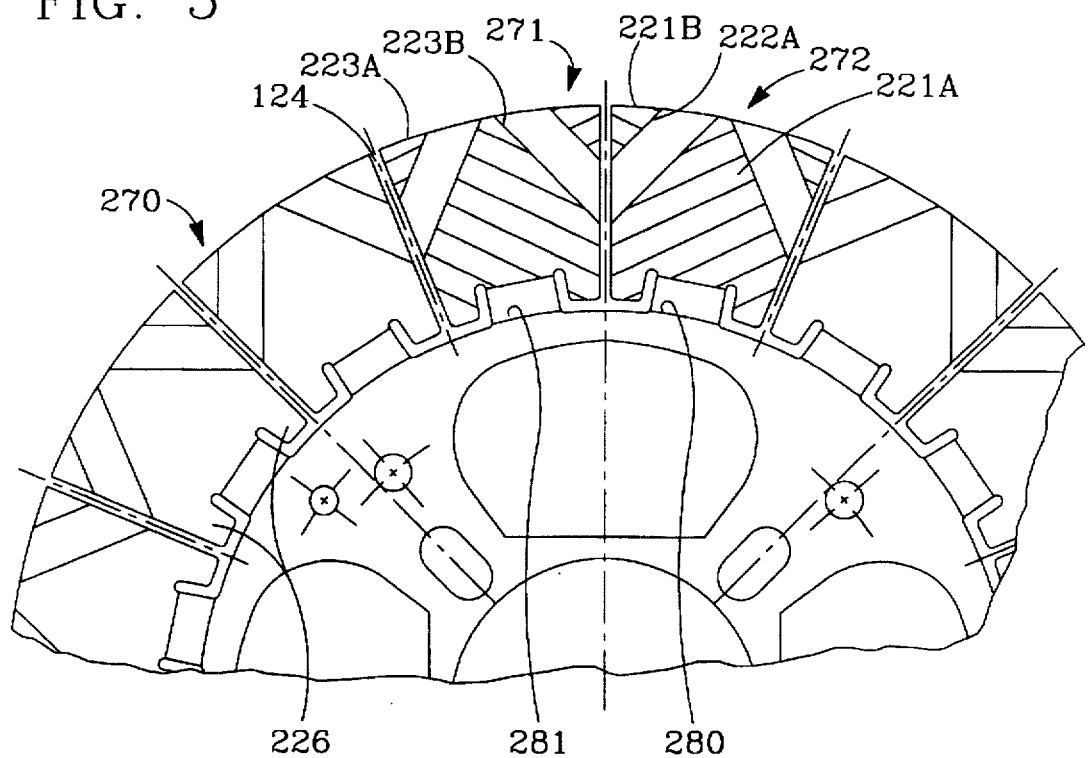
FIGS. 5 and 6 are views similar to FIG. 1 for further embodiments.

In a modification (FIG. 5), the blades of FIG. 15 of the above mentioned document may be used. This is of particular relevance when two discs 161, 162 mounted back to back are provided, with their peripheral support zones 221B in contact with each other.

In that case very large adhesion surfaces are obtained, with the disc 161, 162 comprising for example sixteen blades very close to each other.

The liner support disc may comprise two discs, as in FIGS. 1 and 3, with coupling means limiting the spacing between the discs and being obtained by means of lugs 505 pressed out in the discs 161, 162 in passages or holes 506, radially inwardly of the tangential bent portions 380 (FIG. 1).

The lug 505 parallel to the plane of the central portion of the disc 161, 162 is offset axially with respect to that of the central portion, to which it is joined through an inclined bent portion 512.

Here again, a sub-assembly is formed by effecting a bayonet type fitting. A lug 505 of one of the discs is engaged in a hole 506 of the other disc, and is then turned circumferentially in order to come into engagement either with an associated lug 505 formed in the other disc, or, in a modification, with the edge of the hole 506 (which is accordingly of a reduced size) in the other disc.

In that case, only one of the discs has a hook arranged to cooperate with an abutment surface carried by the other disc and defined by the contour of the hole 506.

One of the discs 161, 162 may have no tripod blades, while the other disc is for example similar to that in FIG. 1.

In that case, all of the progressive action is due to that disc.

The foot portions of the blades may partly comprise the tangential bent portions 380.

The number of coupling means does of course depend on the application. In practice, only one portion (preferably at least three) of the said tripod blades has hooks.

The tripod blades may of course be attached by riveting on the support discs in order to form the peripheral portion of these latter, as for example in FIG. 32 of the above mentioned document EP 0 579 554.

In that case it is possible also to provide two discs coupled together with the coupling means 501, 502-500 of FIG. 1. In this case the tongues 772 in the plane of the support disc have, at their outer periphery, oblique bent portions that delimit peripheral support zones, which are offset towards the central support zones of the tripod blades 771. In this example, these blades have a tongue 725 interrupting the longitudinal bent portion and formed in an aperture 726.

In all cases, the hooks of one of the discs are arranged to cooperate with an associated abutment surface carried by the other disc, and to constitute hooks, for example by virtue of the lugs.

In a modification (FIG. 7), the uni-directionally axially acting coupling means adapted to limit the axial spacing between the two support discs 161, 162 may comprise short posts 1501. These short posts are fixed by their foot to one of the central support surfaces 221A of one of the discs 161, 162, and their shank extends through the other central zone 221A of the other disc 162, 161, so as to have a head beyond the shank.

They are in engagement, by means of their head, on the said other central zone 221A, in order to limit the spacing between the two central zones 221A facing each other, and therefore between the two discs. The central zone 221A, which has a hole for accommodating the shank of the short post, is arranged to slide along the said shank.

Figure 7:
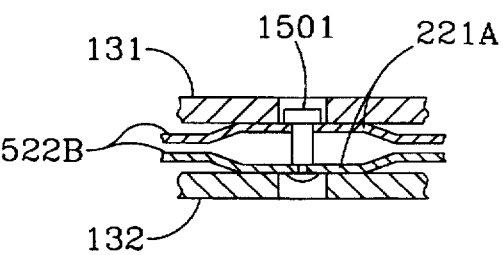
FIG. 7 is a partial view, similar to FIG. 2, for yet another embodiment.
Figure 6:
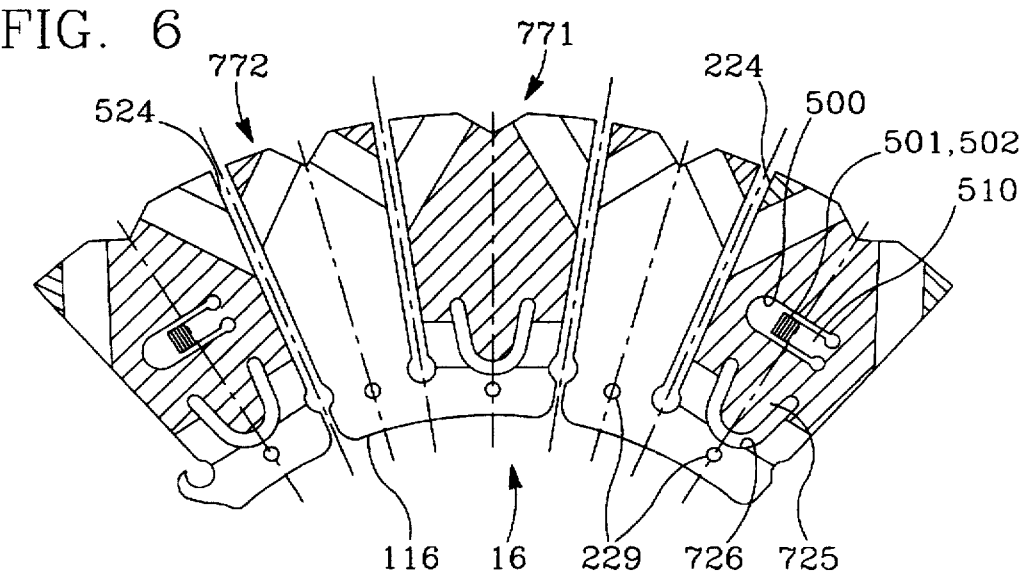

As can be seen in FIG. 7, it is of course necessary to form relief holes in the friction liners 131, 132, secured adhesively on the central support zones 221A, in order to avoid any interference of the head and feet of the short posts with the said friction liners.

This arrangement is similar to that in FIG. 35 of the above mentioned document EP 0 579 554, the difference being that the short posts do not play any part in the fastening of the support discs.

The number of coupling means does of course depend on the application, and may be smaller than the number of tripod blades.

Finally, to the extent that relief holes are provided in the friction liners 131, 132, the lug 501 or 502 may cooperate directly with the edge of the aperture 500 of the central support zone 221A associated with the other support disc.

Similarly, in FIG. 3, it is also possible to provide relief holes in the liners 131, 132, secured adhesively on the central zones 221A, in order to avoid any interference between the lugs 503, 504 and the said friction liners.

As can be seen in FIG. 7, the peripheral support zones 522B can of course very well not be in contact with each other when the clutch is disengaged.

Thus, during engagement of the clutch, a bearing is obtained, the gripping action of which corresponds to the mutual engagement of the zones 522B.

This is made possible because of the coupling means. The hooks 503, 504–505, 506, 511 may be replaced by the short posts of FIG. 7.

I claim:

1. A liner support disc for inclusion in a clutch friction wheel of the kind comprising a central portion (161, 162) defining a plane and a peripheral portion divided into radial blades (572) which are adapted to receive friction liners (131, 132), with each of said blades being joined to the central portion through a foot portion (380) and comprising at least one support zone (221A) which is generally parallel to the plane of the central portion, for contact with at least one of the friction liners and for the fastening of the latter, wherein, in order to define blades of the tripod type, at least some of the blades (572) have a central support zone (221A), for contact with one of the friction liners (131, 132) and for the fastening of the latter, and two peripheral support zones (522B) on either side of said central zone (221A) said central support zone (221A) decreasing in width going towards the outer periphery of said liner support disc, and being offset axially with respect to the central portion (161, 162) and to both of said peripheral support zones (522B), and wherein the central support zone (221A) is joined, firstly to the central portion (161, 162) of the liner support disc by means of a tangential bent portion (380) at right angles to the radial axis of symmetry of said tripod blades, and secondly to said peripheral zones through peripheral bent portions (221A) which are oblique with respect to the radial axis of symmetry of said tripod blades, wherein the friction liner (131, 132) is attached directly by adhesion on the said central support zone associated with it, said liner support disc comprises two support discs mounted back to back, at least one of which has blades of the tripod type, wherein one of the friction liners is secured adhesively on the central support zones (221A) of the said tripod blades, while the other friction liner is secured adhesively on the other disc.

2. A liner support disc according to claim 1, wherein, uni-directionally axially acting coupling means (500, 501, 502–503, 504–505, 506–1501), adapted to limit the axial spacing between the two support discs (161, 162), are interposed between these latter.

3. A liner support disc according to claim 2, wherein, the said spacing means are located at the level of at least some of the central support zones (221A) of the tripod blades.

4. A liner support disc according to claim 2, wherein, the said spacing means are located at the level of at least some of the peripheral support zones (522B) of the tripod blades.

5. A liner support disc according to claim 2, wherein, the said spacing means are located in the support discs (161, 162) at the level of at least some of the tangential bent portions of the tripod blades.

6. A liner support disc according to claim 2, wherein, the said coupling means comprise hooks (501, 502, 503, 504, 505).

7. A liner support disc according to claim 6, wherein, the hooks comprise a lug (501 to 505) extending parallel to one of the elements consisting of the central support zone (221A), the peripheral support zone (522B), and support disc (161, 162), and are joined to the said element by means of a bent portion (510 to 512).

8. A liner support disc according to claim 7, wherein, the lugs (501, 502) are formed in an aperture (500) in the form of an oblong hole formed in the central support zone (221A).

9. A liner support disc according to claim 7, wherein, the lugs (503, 504) are formed at the outer periphery of the peripheral support zones (522B).

10. A liner support disc according to claim 2, wherein, the said coupling means consist of short posts, the foot of which is fixed to one of the central support zones (221A) of one of the support discs (161, 162), with its shank extending through the other central support zone (221A) of the other support disc (162, 161), the post having a head arranged to make contact with the said other central support zone in order to limit spacing between the two tripod blades of the two support discs.

* * * * *